March 3, 1936.   E. F. KENNEY ET AL   2,032,989
RAIL TESTING METHOD
Original Filed Nov. 20, 1931   3 Sheets-Sheet 1

Inventors
E. F. Kenney,
R. B. Gerhardt,
R. E. Dudley.
By R. S. C. Dougherty.
Attorney March 3, 1936.   E. F. KENNEY ET AL   2,032,989
RAIL TESTING METHOD
Original Filed Nov. 20, 1931   3 Sheets-Sheet 2
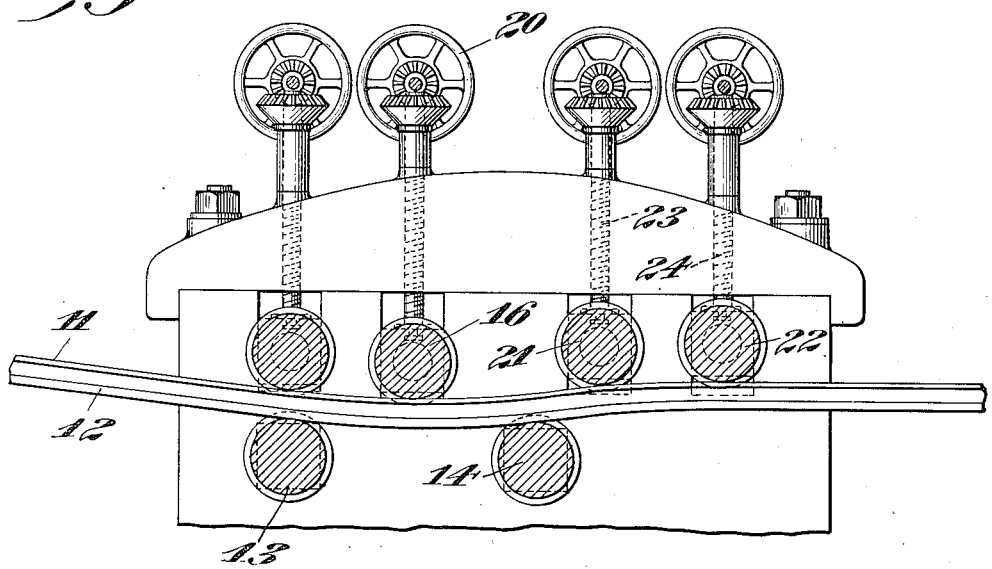
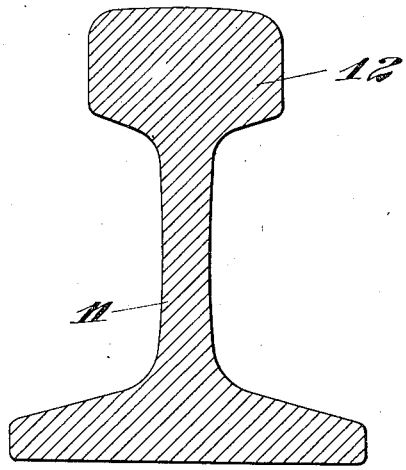
Inventors
E. F. Kenney,
R. B. Gerhardt,
R. E. Dudley.
By R. S. C. Dougherty.
Attorney March 3, 1936.   E. F. KENNEY ET AL   2,032,989
RAIL TESTING METHOD
Original Filed Nov. 20, 1931   3 Sheets-Sheet 3

Inventors
E. F. Kenney,
R. B. Gerhardt,
R. E. Dudley.
By R. S. C. Dougherty
Attorney

UNITED STATES PATENT OFFICE 2,032,989

RAIL TESTING METHOD

Edward F. Kenney, Bethlehem, Reginald B. Gerhardt, Steelton, and Rufus E. Dudley, Bethlehem, Pa., assignors to Bethlehem Steel Company, a corporation of Pennsylvania Application November 20, 1931, Serial No. 576,294
Renewed August 1, 1935

34 Claims. (Cl. 73—51)

Our invention relates to the testing of rails. More particularly it is directed to a process for subjecting rails to a mechanical test which is non-destructive when the rail is relatively free from defects.

The most common method of rail testing at the present time is the well known drop test. This test is unsatisfactory in several respects. In the first place the test is destructive and therefore can only be applied to a relatively small number of rails. Its principal utility is in indicating the general character of a particular heat. If a large lot of rails are defective there is a substantial chance that the drop test will indicate the presence of such defects. Obviously, however, it is impossible to detect the occasional defective structure in rails. If the trouble is not of the group as a whole but is more or less sporadic the test is well nigh useless.

Among the objects of our invention is to provide a non-destructive test, that is a test which while showing the defect in a rail will not destroy a rail when it is substantially free from defects. Another object of our invention is to test substantially the entire rail, that is to test not a limited portion thereof but to test at least at intervals, practically the entire length of the rail for the purpose of ascertaining whether or not defects are present. Another object is to test practically the entire rail continuously from end to end; that is not merely testing the rails at intervals but every portion of the rail lengthwise thereof.

Another object is to have such a test as is available for testing all rails or at least any desired number of rails of the heat. Of course this object is dependent upon the test being non-destructive.

Various non-destructive methods of test have been proposed from time to time. So far as these applicants know these are largely of an electrical or magnetic type. While certain types of defects may be detected by such processes they are not entirely reliable. For example, it is possible for certain defects in the head of the rail to be present at the time of its manufacture which are not indicated in the electrical and magnetic methods yet which develop during its later service into transverse fissures or other serious conditions. In other words the defective structure of the metal frequently requires the stresses of service to become sufficiently marked to indicate their presence during the magnetic and electrical tests. In our mechanical test such defective structure will manifest itself.

Our method is particularly adapted to the finding of defects of a kind which are likely to form transverse fissures and such states of metal structure as might develop into fractures of the rail when in service. These defects appear to be small internal ruptures, or conditions of localized weaknesses or stress which might be designated "incipient" ruptures, conditions which are sometimes designated "shatter zones". Regardless of what the actual character may be of these defects in the rail they have a tendency to develop during service into transverse fissures and the like.

In the magnetic and electrical methods of rail examination, defects of this type are frequently not indicated in the rail prior to service; in fact, it is probably true that such defects are usually not indicated. It may well be that if these defects are of the character of small ruptures in the metal there may be no actual gap or space in the metal of the rail as manufactured, the faces of the rupture still being contiguous and the electrical and magnetic properties of metal thus being substantially unaffected. By our mechanical method of test, however, even a relatively small defect of this character is readily found.

Our invention comprises subjecting a part of a rail, such as the head or the base thereof, to tension of such an amount as to fracture the rail if the part, say the head, is defective but insufficient to have this effect if the part is free from substantial defects.

More specifically our invention comprises subjecting the rail progressively along its length to a bending moment to place the part under tension, the stress being sufficiently great to fracture it if the metal of the part is defective but insufficient to produce this effect if the rail part is substantially free from defects.

In carrying out our invention we engage the rail at spaced points on the head of the rail, for example, and engage the base of the rail at a point intermediate the points on the head of the rail and exert at these points opposed forces to subject the rail to a bending moment in the vertical plane of the web to place the head of the rail under sufficiently great tension to fracture the rail head if the metal thereof contains substantial defects but insufficient to produce this effect if the metal is substantially free therefrom. To test practically the entire length of the rail the points of engagement for the application of forces to produce tension in the head is changed lengthwise of the rail to progressively subject the rail head to the testing tension. Such change of points of engagement may be at intervals or it may be continuous.

Probably the invention can be most effectively set forth by describing illustrative embodiments thereof. Accordingly we shall describe several methods of carrying out the process, setting forth the continuous method of test and also the method of subjecting the rail part to tension at regular intervals.

Referring to the drawings:

Fig. 1 gives in elevation, partly in section, a view of a device for continuously testing a rail;

Fig. 3 is a similar view of a like device but including means to straighten the rail after deformation produced during the testing operation.

Fig. 4 is a cross section of a rail treated in accordance with our invention.

Figure 1:
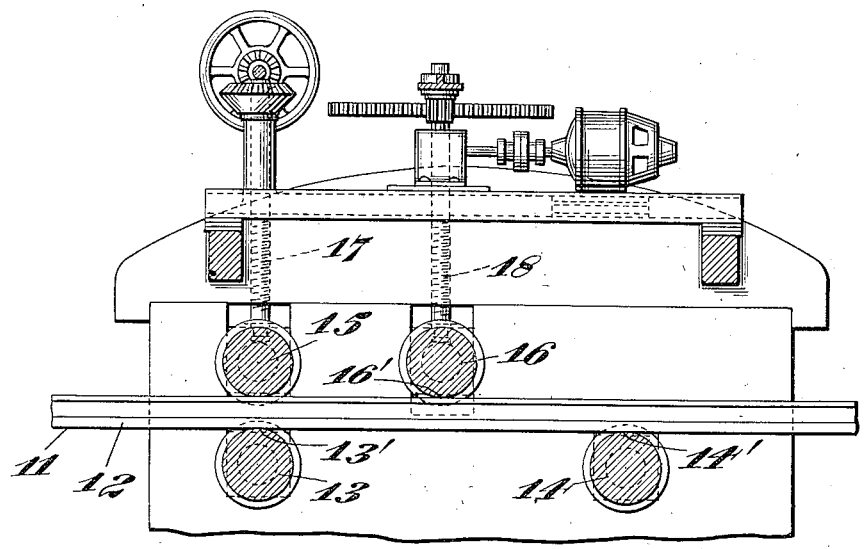
Figure 2:
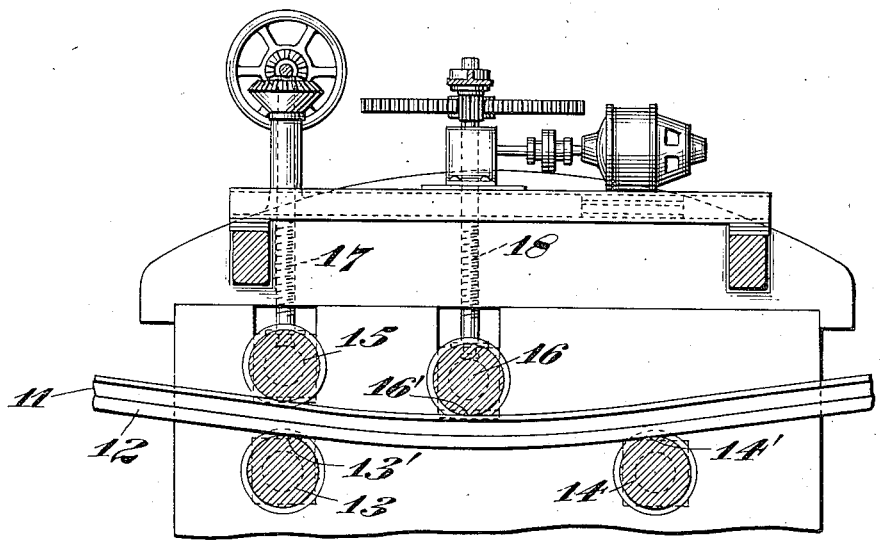
Fig. 2 is a similar view of the same device but showing the rail under deformation, the head being placed under tension.

Referring to the method illustrated in Figs. 1 and 2. The rail 11 is passed, with head 12 down, over rolls 13 and 14. Rolls 13 and 15 are pinch rolls adjustment of which toward and from each other may be effected by the screw mechanism 17 in the usual way. The head 12 of the rail, as is obvious, is engaged at spaced points or regions 13' and 14' respectively. Roll 16 which is adjustable by screw 18 toward and from the rail 11 is adapted to engage point or region 16' on the base of the rail, intermediate points 13' and 14' on the head of the rail.

Roll 16 is adjusted downwardly to exert such force upon the rail as to bend the rail somewhat, this exertion of force by roll 16 of course being accompanied by reactive forces of rolls 13 and 14 in an opposite direction. The bending moment to which the rail is thus subjected places the head of the rail under tension. Roll 16 is adjusted downwardly sufficient to produce such tension in the rail head as will cause the rail to fracture if substantial defects are present in the rail metal. The adjustment of roll 16 downwardly, however, is short of that sufficient to produce such tension in the rail head as would fracture the rail in the absence of substantial defects in the head. The particular degree of stress will vary with different rails and with different sections of rails and with the material of which they are made and with the heat treatment to which they may have been subjected. For any particular kind of rail the degree of stress necessary must be determined more or less empirically. Usually we find a tension somewhere in the vicinity of the elastic limit to be satisfactory. Frequently a stress just short of the elastic limit is found to be very satisfactory. Obviously, however, we do not wish to be limited to any particular degree of stress. The important thing is that the head shall be subjected to such a degree of tension as will fracture it if defects are present but insufficient to fracture it if substantially undefective. We have found that the elastic limit may be exceeded in many cases without substantial detriment to the rail. We have also found that once having determined that a particular degree of stress will fracture the rail when defects are present this particular stress can be greatly exceeded without untoward results. Obviously, however, such stresses should not be employed as will fracture sound metal free from defects.

Having determined the proper amount of adjustment of roll 16 to produce the desired degree of stress in the head of the rail, the entire rail may be passed continuously through the device to subject it progressively along its length to the testing tension.

When the stress employed is beyond the elastic limit of the metal the rail will usually be deformed; in the example just given the rail will be curved concavely with respect to the base and convexly with reference to the head. In such case the rail, following the test, is subjected to a straightening operation.

In Fig. 3 is shown a device, similar to that shown in Figs. 1 and 2, but adapted to straighten the rail subsequent to the deformation produced during the test. The rail 11 is passed, head 12 down over rolls 13 and 14, as in the test using the device of Figs. 1 and 2, roll 16 being adapted to engage the base of the rail at an intermediate point for the purpose of effecting a deflection of the rail between rolls 13 and 14 in the manner earlier described, adjusting means 20 being provided for effecting adjustment of rolls 16 in a well known manner. This device possesses in addition rolls 21 and 22 which are adapted to engage the base of the rail after it has passed over rolls 13 and 14. Rolls 21 and 22 are individually adjustable by means of screws 23 and 24. By suitably adjusting the position of these rolls the rail curvature produced by the test can be overcome and the rail straightened.

This method of test is particularly adapted for testing heat treated rails. We have found that when defects are present in such heat treated rails it is possible with a very moderate deflection to fracture the rails. Accordingly we shall now briefly describe the application of the process just outlined to a heat treated rail.

This particular example is of rails made of steels having the following compositions:

| Carbon | Manganese | Phosphorus | Sulphur | Silicon |
|--------|-----------|------------|---------|---------|
| .62    | 1.32      | .023       | .044    | .16     |
| .72    | 1.43      | .022       | .042    | .19     |
| .68    | .72       | .023       | .062    | .13     |
| .72    | .79       | .024       | .060    | .19     |
| .74    | .69       | .023       | .049    | .26     |
| .86    | .81       | .023       | .057    | .22     |

Rails having a section like that indicated in Fig. 4 and weighing 130 lbs. per yard were allowed to cool from the mill heat until the edges of the flanges became magnetic. They were then immediately quenched in water for about 25 seconds following which they were then immediately equalized in a bath of lead at a temperature of about 800 to 900° F. and then subjected to a "temper drawing" operation in a furnace maintained at a temperature of about 900°, being kept in this furnace for about two hours following which the rails were allowed to cool to atmospheric temperature.

These rails were then passed continuously through the device shown in Figs. 1 and 2. It was found that with points 13' and 14' 90" apart the appropriate stress in the rail head could be produced by screwing down roll 16 sufficiently to produce a deflection in the rail of $\frac{9}{16}''$, the stress thus produced in the head being very close to the elastic limit. The stress thus produced in this particular section was found sufficient to cause the rail head to fracture if any substantial defects were present of the particular type which has already been described.

With this particular rail, heat treated as indicated, such adjustment downwardly of roll 16 as to produce a ¾" deflection, thus getting well beyond the elastic limit of the material, was not appreciably more effective in locating defects than the $\frac{9}{16}''$ deflection. Accordingly for the particular rail indicated the lesser deflection and therefore the lesser stress in the head are preferable, as when the elastic limit is not exceeded less subsequent straightening of the rail is necessary.

We do not wish to convey the idea, however, that the greater stress may not be successfully used as it likewise enabled one to determine the presence of substantial defects without injuring the metal free therefrom. We do not intend the example of our invention just given to be restrictive. While 90" is a useful distance apart of the point 13' and 14', other distances may be used. Obviously by having rolls 13 and 14 closer together it is possible to test the rails much closer to their ends.

Figure 5:
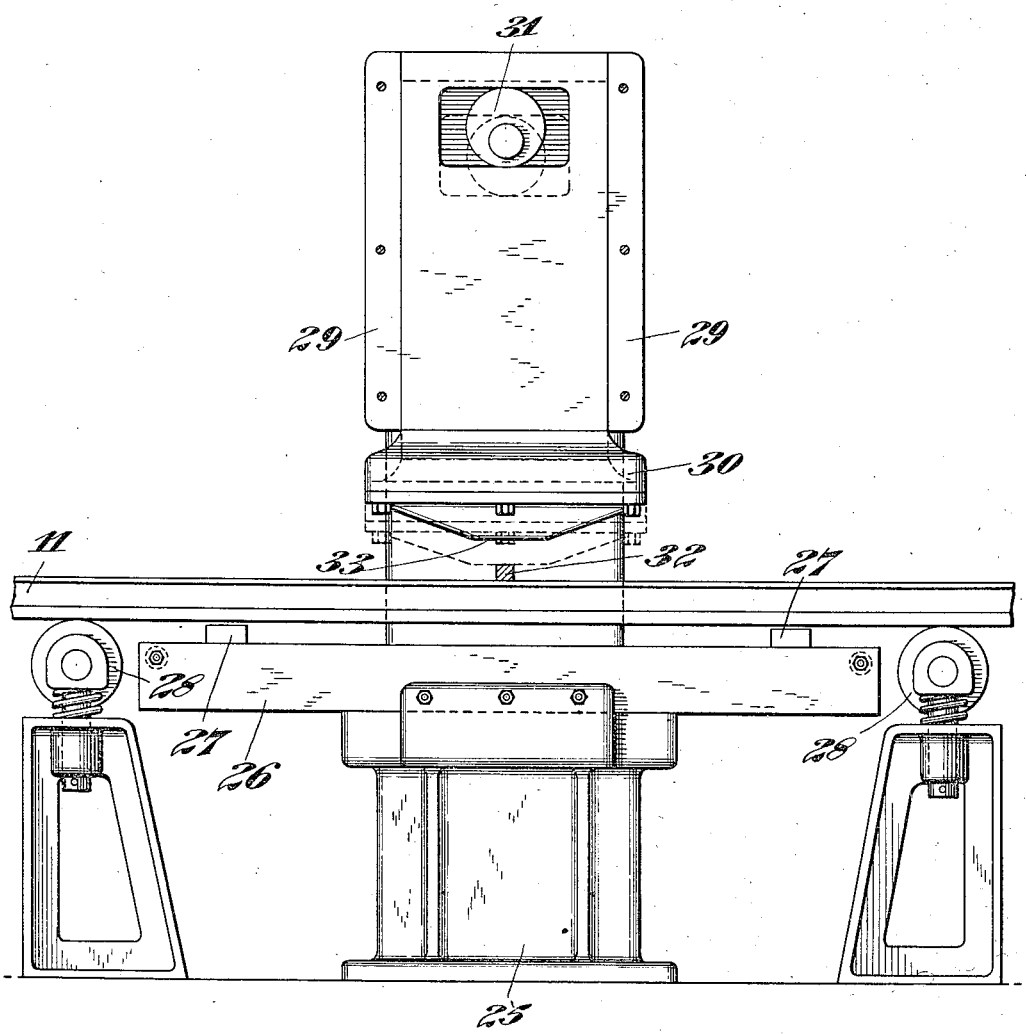
Fig. 5 is an elevation of a device adapted to subject the rail at intervals to the testing tension.

While the method, using an apparatus, such as shown in Figs. 1, 2 and 3, is believed by us to be preferable, a gag press may be employed. Fig. 5 is a conventional showing of a gag press. It comprises the pedestal 25 carrying the table 26 which is provided with anvils 27. Head 30 is adapted to slide in guideways 29 and is adapted to be actuated by cam 31, in the well known manner. Rail 11 is adapted to be fed intermittently on rolls 28 over anvils 27, head down. Upon a downward stroke of head 30 the hammer portion 33 is adapted to engage the gag or block 32 resting upon the base of the rail at a point intermediate anvils 27 and to force the rail downwardly. As is evident, supporting rolls 28 being yieldably supported move downwardly with the rail until the rail engages anvils 27, the continued downward movement of the head subjecting the rail to a bending moment resulting in a deflection of the metal between the anvils to an amount which depends upon the downward stroke of the head and upon the position and dimensions of gag or block 32.

As in the previous example of the invention, the deflection is chosen to produce that amount of tension in the head of the rail sufficient to fracture the head if substantial defects are present but insufficient to do so if consequential defects are absent. Obviously the rail is stationary upon each application of the bending moment by a downward movement of the head.

In each of the specific examples given above the head has been placed under tension, this being the part of the rail subjected to the test. In actual practice this is the part of the rail most needful of test. Other parts of the rail, however, may be placed under tension to test them. Whatever the part of the rail to be tested the rail should be subjected to a bending moment to place that part to be tested under tension. For example, if it is desired to test the base of the rail in the devices shown the rail is passed through them in a reverse position to that shown so as to bring the base, instead of the head, under tension.

Both the head and the base of the same rail may be tested and this has been found to be a very useful method. For example, the rail may be passed through the device of Figs. 1 and 2 in the manner shown and described to test the head of the rail and the rail then reversed and passed through the device with the head up and the base down to place the base under tension and thereby test both the head and the base of the rail.

By this method it will be readily seen that the rail is tested at intervals, that is the rail is not tested continuously as in the previous example but is tested by subjecting the rail to a bending moment at selected space intervals. It is obvious that the length of these intervals may be chosen of any value. It is also obvious that the closer the tests are, that is the shorter the intervals, the more nearly perfect the examination of the rail can be. It will be readily apparent that with this method of test as complete an examination of the rail is not possible as with the use of the device shown in Figs. 1 and 2.

By means of our invention it is possible to test the rail mechanically and yet not injure the rail for use in track unless the rail is defective, in which case, by the very character of the tests, the rail is destroyed and thereby prevented from going into service. Obviously the advantage of such a test is very great as all the rails which are intended for service may be tested, and not merely an occasional representative rail which is not intended for service; and only those rails which are safe for service survive the tests, the rails of defective metal structure being automatically eliminated.

This application is a continuation in part of our application Serial No. 548,274, filed July 2, 1931.

Having thus described our invention what we claim as new and desire to secure by Letters Patent is:

1. In a process for testing a rail, the steps of supporting the head of a rail at spaced parts of the head of the rail, applying pressure to the base of the rail at a point intermediate the spaced parts to produce tension in the head sufficient to fracture it if the metal contains defects of magnitudes which service conditions would fail to reveal immediately but insufficient to fracture it if free from substantial defects and subjecting the rail continuously and progressively along its length to such conditions.

2. In a process for testing a rail, the steps of supporting the head of a rail at spaced parts of the head of the rail, applying pressure to the base of the rail at a point intermediate the spaced parts to produce tension in the head sufficient to fracture it if the metal contains defects of magnitudes which service conditions would fail to reveal immediately but insufficient to fracture it if free from substantial defects, and subjecting the rail at spaced points along its length to such conditions, the spacing of said points being in such increments that substantially the entire rail head is progressively subjected to said pressure.

3. In a process for testing a heat treated rail, the steps of supporting the head of a rail at spaced parts of the head of the rail, applying pressure to the base of the rail at a point intermediate the spaced parts to produce tension in the head sufficient to fracture it if the metal contains defects of magnitudes which service conditions would fail to reveal immediately but insufficient to fracture it if free from substantial defects and subjecting the rail continuously and progressively along its length to such conditions.

4. The process for testing a rail, the steps of supporting a portion of a rail at spaced parts along the length of such portion, applying pressure to an opposite portion of the rail at a point intermediate the spaced parts to produce tension in the first mentioned portion sufficient to fracture it if the metal contains defects of magnitudes which service conditions would fail to reveal immediately but insufficient to fracture it if free from substantial defects and subjecting the rail continuously and progressively along its length to such conditions.

EDWARD F. KENNEY.
REGINALD B. GERHARDT.
RUFUS E. DUDLEY.